United States Patent
Zellmer et al.

[15] 3,670,233
[45] June 13, 1972

[54] DC TO DC CONVERTER

[72] Inventors: Neale A. Zellmer, Belmont; Wayne B. Johnson, Los Altos, both of Calif.

[73] Assignee: GTE Automatic Electric Laboratories Incorporated, Northlake, Ill.

[22] Filed: April 12, 1971

[21] Appl. No.: 133,035

[52] U.S. Cl..............................323/17, 317/33 VR, 307/297, 323/22 T, 323/DIG. 1
[51] Int. Cl.........................................................G05f 1/56
[58] Field of Search................323/17, 22 T, DIG. 1; 317/33; 307/297

[56] References Cited

UNITED STATES PATENTS

| 3,559,040 | 1/1971 | Fickenscher | 323/DIG. 1 |
| 3,497,794 | 2/1970 | Fredrickson et al. | 323/DIG. 1 |
| 3,577,065 | 5/1971 | Putzrath et al. | 323/DIG. 1 |
| 3,393,347 | 7/1968 | Webb | 317/33 |
| 3,204,174 | 8/1965 | Clerc | 323/DIG. 1 |

Primary Examiner—Gerald Goldberg
Attorney—K. Mullerheim, Theodore C. Jay, Jr., Leonard R. Cool and Russell A. Cannon

[57] ABSTRACT

A circuit for efficiently converting unregulated direct current voltage into a regulated direct current voltage of lower magnitude across a load in which a capacitor and an inductor are used to store electrical energy with a switch to alternately connect and disconnect the circuit to the unregulated voltage source, the switch being controlled by a circuit in which zener diodes are used to detect variations in regulated voltage and turn the switch "on" or "off" in response to rises and falls in load voltage from a predetermined value.

4 Claims, 3 Drawing Figures

3,670,233

INVENTORS
NEALE A. ZELLMER
WAYNE B. JOHNSON
BY Leonard R. Cool

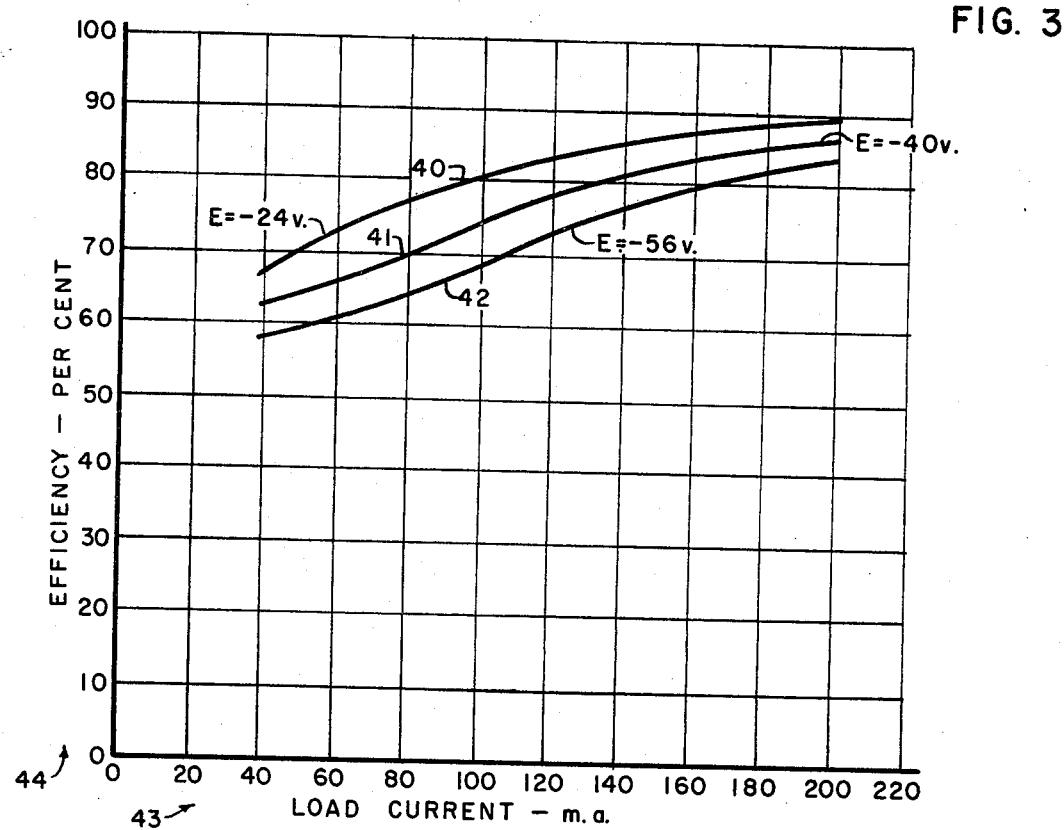

DC TO DC CONVERTER

BACKGROUND OF THE INVENTION

This invention relates generally to voltage converters and in particular to voltage converters which convert a direct current voltage from a higher to a lower magnitude.

In many applications in communications, especially telephony, there is a need for a supply of direct current power in which the voltage is stable over a relatively broad range of current flow. In addition, there is also a need for equipment which is relatively efficient in its operation so that less heat is dissipated which would tend to raise the temperature of circuit components such as transistors and diodes and detrimentally affect their operating characteristics.

Prior art techniques accomplishing this include the use of transistors in conjunction with diodes and capacitors to act as voltage dividers, or a capacitor, inductor and diodes along with a switch which alternately connects and disconnects the power source from the load. The means for controlling the switch in the prior art circuits are generally quite complicated and involve circuits which use transformers and other devices that absorb energy and circuits which are designed to create delayed pulses or oscillating currents which determine the "on" or "off" time of the switch and therefore the rise or fall of the load voltage relative to a predetermined value.

SUMMARY OF THE INVENTION

The circuit of the present invention comprises a capacitor and an inductor which act as energy storage devices with a means for switching current to the load controlled by diodes having predetermined reverse current breakdown voltages, i.e. "zener" diodes, to sense and act as the means for regulating the load voltage.

It is, therefore, an object of the present invention to provide a direct current voltage regulator in which the input current is switched "on" and "off" to regulate the output voltage.

It is a further object of the present invention to provide a direct current voltage regulator in which the output voltage is measured and fed back to control the switching of the input current.

It is still another object of the present invention to provide a direct current voltage regulator in which zener diodes are used to sense and regulate the output voltage.

These and other objects of the present invention will be manifest upon a detailed study of the following specification when taken together with the drawings.

BRIEF DESCRIPTION OF THE DRAWINGS

FIG. 3 is a graph showing the efficiency of the circuit of the present invention at various load currents and input voltages.

DETAILED DESCRIPTION

Figure 1:
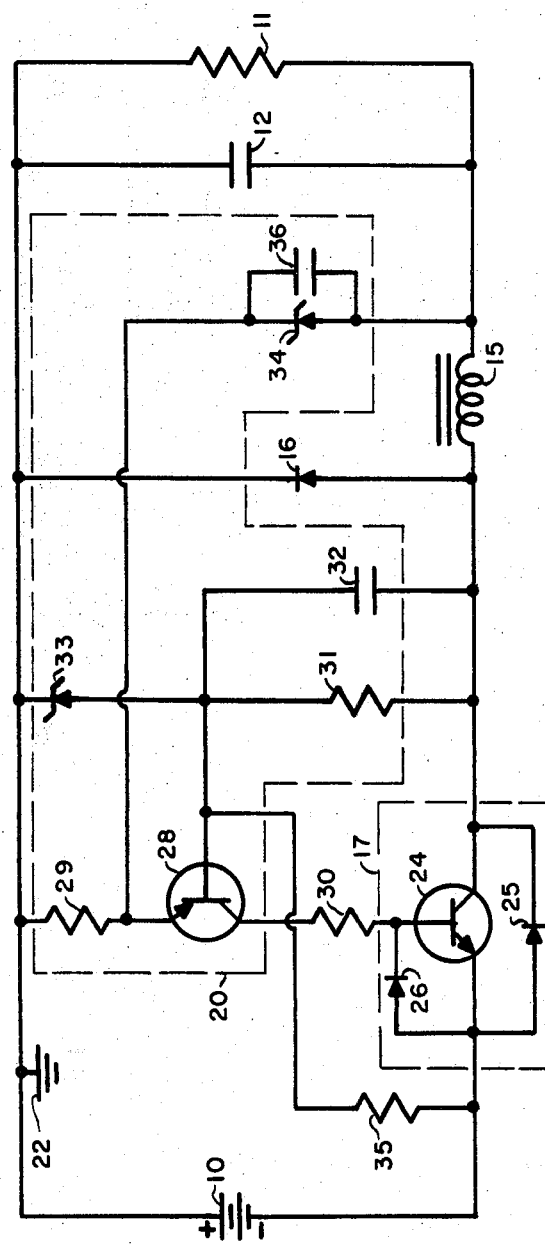
FIG. 1 is a circuit diagram of the preferred embodiment of the present invention.

The preferred embodiment of the DC to DC converter of the present invention is shown in FIG. 1 in which the flow of power through the circuit is from left to right, from unregulated direct current source 10 to load resistor 11.

Basically, the circuit of FIG. 1 comprises; an electrical power source 10 furnishing unregulated direct current to the circuit; load capacitor 12 connected in parallel with load resistor 11; an inductor 15 connected in series with load capacitor 12 and load resistor 11; a commutating diode 16 connected in parallel with the series-parallel combination of inductor 15, capacitor 12 and load resistor 11; a switching circuit 17 connected to the negative side of power source 10; and switch control circuit 20 connected to the junction of inductor 15 with capacitor 12 and load resistor 11, the switching circuit 17, and the positive side of power source 10.

The positive side of power source 10 is connected to a ground 22.

Switching circuit 17 comprises n-p-n power switching transistor 24 having its collector connected to inductor 15 at the junction of commutating diode 16, its base connected to the input of control circuit 20, and its emitter connected to the negative side of power source 10.

Diodes 25 and 26 are connected, respectively, between the emitter and collector, and emitter and base of transistor 24 in order to prevent damage to the transistor from high voltage current surges.

Control circuit 20 comprises p-n-p switch control transistor 28 having its emitter connected to the positive side of power source 10 through current limiting resistor 29, its collector connected to the base of power switching transistor 24 through power limiting resistor 30 and its base connected to the collector of power switching transistor 24 through the parallel combination of feedback resistor 31 and feedback capacitor 32.

In control circuit 20, zener reference diode 33 is connected with its "n" side of the junction to the positive side of power source 10 and its "p" side of the junction to the base of switch control transistor 28.

Zener sensing diode 34 is connected with its "n" side of the junction to the emitter of switch control transistor 28 and its "p" side of the junction to the junction of capacitor 12, load resistor 11 and inductor 15. Capacitor 36 is connected across diode 34 in order to reduce jitter and smooth the switching operation.

In order to initially provide a forward bias for the emitter-base junction of switch control transistor 28 during start-up, i.e., when the circuit is first connected to power source 10, a start-up resistor 35 of relatively high resistance is connected between the negative side of power source 10 and the base of switch control transistor 28.

To illustrate the operation of the circuit of the present invention, let power source 10 be connected to the circuit. At time "zero" the full voltage of power source 10 is applied across start-up resistor 35 to the base of switch control transistor 28, forward biasing the emitter-base junction, thus starting to turn transistor 28 "on" and supplying a base drive for power switching transistor 24, thus starting to forward bias the emitter-base junction of transistor 24 to turn it "on". Turning transistor 24 "on" causes its collector to start moving negatively which feeds back to the base of transistor 28 through the parallel combination of capacitor 32 and resistor 31 taking control away from resistor 35, which, after the first cycle, serves no other purpose. From thence on for either transition, from "on" to "off" or "off" to "on", the resistor-capacitor network (resistor 31 in parallel with capacitor 32) works as a regenerative feedback circuit to speed up switching time.

As switching transistor 24 is turned "on" by application of the voltage to its base, it will become saturated and current will flow to power source 10 causing a small voltage drop from emitter to collector.

Current will now flow through the parallel combination of load resistor 11 and load capacitor 12 and in series through inductor 15.

As the current increases through inductor 15, capacitor 12 charges to a voltage equal to the reverse bias breakdown voltage of zener diode 34 plus zener diode 33 minus the emitter-base voltage drop across transistor 28, at which time the voltage across resistor 29 starts going more negative which causes transistor 28 to start turning "off". As transistor 28 turns "off" it turns transistor 24 "off" causing the base voltage of transistor 28 to increase which is detected by feedback capacitor 32 forcing the base voltage of transistor 28 still further in the positive direction insuring rapid cut-off. In turn, the base voltage of switching transistor 24 is made more negative thus rapidly turning switching transistor 24 "off".

With the current to power source 10 now cut off, the energy stored in inductor 15 now causes a commutating current to flow through commutating diode 16.

With current now decreasing through inductor 15, load capacitor 12 now begins to supply its charge and the voltage begins to become less negative across load resistor 11. The current toward the load through inductor 15 will then decay to a point where it no longer provides enough power to keep commutating diode 16 in conduction.

At the instant commutating diode 16 stops conducting, the load current to load resistor 11 is derived entirely from the load capacitor 12, therefore, the output voltage starts decaying. In the meantime, zener diode 33 has been biased "on" by the output voltage feeding back through inductor 15 and resistor 31. The voltage across resistor 29 is held at a value equal to output voltage minus zener diode 34 voltage. As the output voltages decay toward ground, the potential of the emitter of transistor 28 gradually moves positive relative to its base. At some point transistor 28 starts conducting which regeneratively and rapidly turns control transistor 28 "on" and the cycle is repeated.

The regulated voltage across load resistor 11 is determined by the sum of the breakdown voltages of reference zener diode 33 and sensing diode 34 less the rather small voltage drop between the emitter and base of switch control transistor 28. For example:

$$V_{ref} = -V_{33} + V_{eb28} - V_{34}$$

where, $V_{ref}$ = Reference or regulated voltage across load resistor 11.

$V_{33}$ = Reverse bias breakdown voltage of reference zener diode 33.

$V_{34}$ = Reverse bias breakdown voltage of sensing zener diode 34.

$V_{eb28}$ = Voltage drop across the emitter-base junction of switch control transistor 28.

It has been found that the ripple voltage or "hysteresis" voltage can be determined in accordance with the following equation:

$$V_h = 2 \log^{-1} \left( 0.9506 - \log C - \frac{0.0367}{i_L} \right)$$

where, $V_h$ = Ripple or Hysteresis voltage.
$C$ = Capacitance of load capacitor 12 in microfarads.
$i_L$ = Load current.

To design a circuit, once the load current and reference voltage are specified, the ripple or hysteresis voltage can be determined to establish the size of load capacitor 12.

Once the size of load capacitor 12 and load resistor 11 are known, it becomes possible to determine the value of inductor 15. The value $(2Q)^2$ must be greater than unity, and since Q is defined as $R \sqrt{C/L}$, the condition that $L < 4R^2C$ must be met, where $R$ is the value of load resistor 11, $C$ the value of load capacitor 12 and $L$ the inductance of inductor 15.

It has been found that for DC to DC converters with high current capacities, the value of $(2Q)^2$ will approach unity. The inductor should be chosen in such a manner that it does not saturate during the switching cycle.

For the circuit shown in FIG. 1, with a regulated voltage $V_{ref}$ of 21.2 volts, for a power source 10 voltage range of from −24 to −56 volts, the values of the components are those shown in Table I as follows:

TABLE I

| | |
|---|---|
| 100K ohms | Start-up resistor 35 |
| 422 ohms | Current limiting resistor 29 |
| 5.11K ohms | Power limiting resistor 30 |
| 0.068 microfarad | Capacitor 36 |
| 11K ohms | Feedback resistor 31 |
| 100 V reverse breakdown | Protective diode 25 |
| 100 V reverse breakdown | Protective diode 26 |
| 5.6 V | Zener reference diode 33 |
| 16.3 V | Zener sensing diode 34 |
| 1 amp current rating | Commutating diode 16 |
| 0.001 microfarad | Feedback capacitor 32 |
| 100 microfarad | Load capacitor 12 |
| 3.5 millihenry | Inductor 15 |

The efficiency of the circuit using the above components is shown in FIG. 3 in which the curves of efficiency in percent are shown as a function of load current for three power source 10 voltages "E".

Load current is measured in milliamperes along the abscissa 43 while efficiency is shown as a percentage defined as the ratio of the output power divided by the input power times 100 along the ordinate 44.

Curve 40 represents the efficiency when the voltage of power source 10 is −24 volts; curve 41 when it is −40 volts; and curve 42 when it is −56 volts.

The regulated output voltage for the circuit is 21.2 volts.

Figure 2:
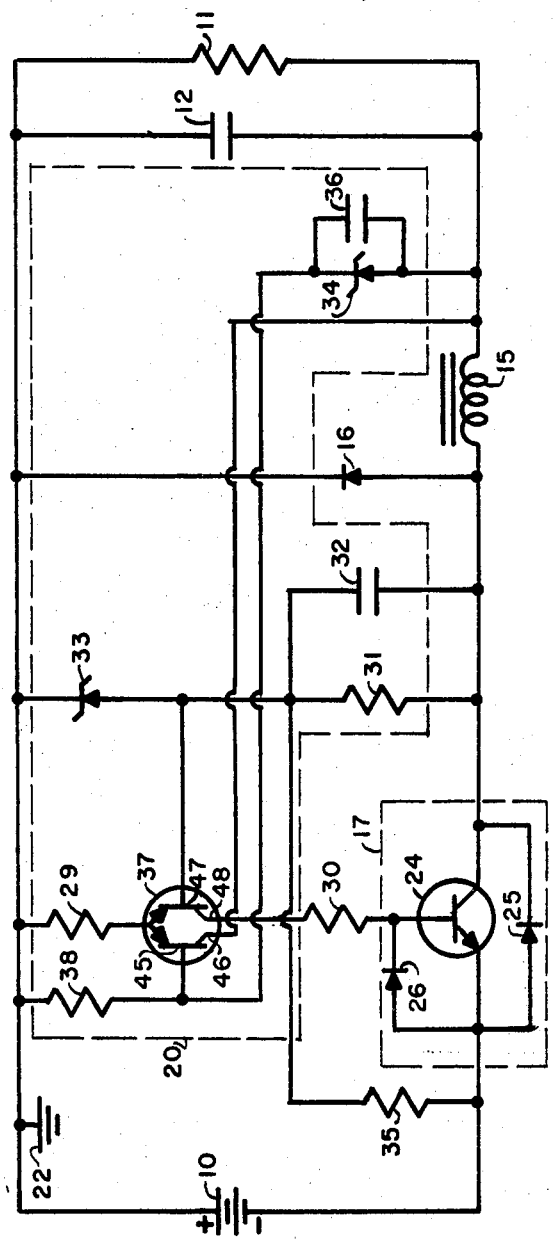
FIG. 2 is a circuit diagram of a second embodiment of the present invention using a differential transistor amplifier for control of the switching means.

With reference to FIG. 2, there is illustrated a second embodiment of the circuit of the present invention identical in all respects to the circuit of FIG. 1 with the exception that switch control transistor 28 has been replaced by differential transistor amplifier 37 and one additional current limiting resistor 38 added to limit the flow of current through the sensing side of differential amplifier 37.

Using the components previously described for FIG. 1, resistor 38 will be approximately 1,000 ohms.

It will be noted that differential transistor amplifier 37 is a p-n-p type of transistor similar to switch control transistor 28.

Transistor 37 comprises a sensing base 45 connected to the positive side of power source 10 through current limiting resistor 38 and to the junction of load resistor 11, load capacitor 12 and inductor 15 through sensing zener diode 34. Sensing collector 46 is connected directly to the junction of load resistor 11, load capacitor 12 and inductor 15.

Transistor 37 also comprises reference base 47 connected to the positive side of power source 10 through reference zener diode 33; to the collector side of switching transistor 24 through parallel connected feedback resistor 31 and feedback capacitor 32; and to the emitter side of switching transistor 24 through start-up resistor 35. Reference collector 48 of transistor 37 is connected to the base of switching transistor 24 through power limiting resistor 30.

As for the operation of the circuit of FIG. 2, it can be seen that the mechanism of start-up is the same as that for the circuit of FIG. 1.

At time "zero" the full voltage of power source 10 is applied across start-up resistor 35 turning the reference side of differential amplifier 37 "on" to turn switching transistor 24 "on".

Current will now flow through the parallel combination of load resistor 11 and load capacitor 12 and through the inductor 15 that is connected in series with them.

With sensing zener diode 34 now connected to base 45 of differential amplifier 37, the sensitivity of zener diode 34 has been increased by the current gain of the sensing side of transistor 37 when looked at as a grounded collector type of transistor amplifier.

It will be noted that the embodiment as illustrated in FIGS. 1 and 2 is grounded on the positive side of power source 10. The two embodiments will also operate with the polarity of power source 10 reversed so that the circuit is grounded on the negative side of power source 10. In such case, power switching transistor 24 should be a p-n-p type transistor while switch control transistor 28 and differential amplifier transistor 37 should be n-p-n type transistors. In addition, the "p" and "n" sides of the junctions of commutating diode 16, protective diodes 25 and 26, and zener diodes 33 and 34 should be reversed for proper direction of current flow.

We claim:

1. A DC to DC converter that is a two-port network for converting a direct current input voltage from an electrical power source into a regulated direct current output voltage of lower magnitude across a load, comprising
an input port having a pair of input terminals for connection across the power source;
an output port having a pair of output terminals for connection across the load;
a first capacitor connected across said output terminals;

an inductor having a first terminal connected to one output terminal and having a second terminal;
only two transistors
one of the two transistors being a switching transistor having an emitter electrode connected to one input terminal, having a collector electrode connected to said second terminal of said inductor, and having a base electrode, said first transistor being alternately conducting and nonconducting for selectively switching current from the power source to said inductor and first capacitor;
the other of the two transistors being a single control transistor having an emitter electrode connected to the other input and other output terminals, having a collector electrode connected to said switching transistor base electrode, and having a base electrode;
a first semiconductor diode connected between said second terminal of said inductor and the other output terminal for commutating current from said inductor when said switching transistor is nonconducting;
a second diode which is a zener diode connected between said one output terminal and said control transistor emitter electrode for sensing variations in voltage across said output port;
a third diode which is a zener diode connected between said control transistor base electrode and said other input terminal for establishing a reference voltage therebetween; and
a second capacitor regeneratively coupling said switching transistor collector electrode to said control transistor base electrode;
said control transistor comparing variations in the output voltage across said first capacitor that are sensed by said second diode and the reference voltage set by said third diode for turning said switching transistor on and off according to variations in the output voltage.

2. The converter according to claim 1 including a third capacitor connected in parallel with said second diode for integrating variations in the voltage across said output port.

3. The converter according to claim 2 including a first start-up resistor connected between said switching transistor emitter electrode and said control transistor base electrode and a second resistor connected across said second capacitor.

4. The converter according to claim 3 including fourth and fifth semiconductor diodes connected across said switching transistor emitter-base junction and emitter-collector junction, respectively, for protecting these junctions.

* * * * *